US007505970B2

(12) United States Patent
Adya et al.

(10) Patent No.: US 7,505,970 B2
(45) Date of Patent: Mar. 17, 2009

(54) SERVERLESS DISTRIBUTED FILE SYSTEM

(75) Inventors: Atul Adya, Redmond, WA (US);
William J. Bolosky, Issaquah, WA (US);
Gerald Cermak, Bothell, WA (US);
John R. Douceur, Bellevue, WA (US);
Marvin M. Theimer, Bellevue, WA (US); Roger P. Wattenhofer, Zurich (CH)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 10/959,701

(22) Filed: Oct. 6, 2004

(65) Prior Publication Data

US 2005/0044092 A1 Feb. 24, 2005

Related U.S. Application Data

(63) Continuation of application No. 10/005,629, filed on Dec. 5, 2001, now Pat. No. 7,062,490.

(60) Provisional application No. 60/278,905, filed on Mar. 26, 2001.

(51) Int. Cl.
*G06F 7/00* (2006.01)
*G06F 17/30* (2006.01)

(52) U.S. Cl. ............................................. 707/8; 707/10

(58) Field of Classification Search ...................... 707/1, 707/2, 4, 8–10, 102; 714/1, 3, 4, 10
See application file for complete search history.

(56) References Cited

U.S. PATENT DOCUMENTS

| 5,202,982 | A | 4/1993 | Gramlich et al. |
| 5,317,728 | A | 5/1994 | Tevis et al. |
| 5,371,794 | A | 12/1994 | Diffie et al. |
| 5,452,447 | A | 9/1995 | Nelson et al. |
| 5,483,652 | A | 1/1996 | Sudama et al. |
| 5,553,235 | A | 9/1996 | Chen et al. |
| 5,564,037 | A | 10/1996 | Lam |
| 5,586,330 | A | 12/1996 | Knudsen et al. |
| 5,588,147 | A | 12/1996 | Neeman et al. |
| 5,680,611 | A | 10/1997 | Rail et al. |

(Continued)

FOREIGN PATENT DOCUMENTS

EP 0663640 7/1995

(Continued)

OTHER PUBLICATIONS

A. Goldberg et al., "Towards an Archival Intermemory" IEEE International forum on Research and Technology Advances in Digital Libraries, pp. 147-156, April 1998.

(Continued)

*Primary Examiner*—Don Wong
*Assistant Examiner*—Merilyn P Nguyen
(74) *Attorney, Agent, or Firm*—Lee & Hayes, PLLC

(57) ABSTRACT

A serverless distributed file system manages the storage of files and directories using one or more directory groups. The directories may be managed using Byzantine-fault-tolerant groups, whereas files are managed without using Byzantine-fault-tolerant groups. Additionally, the file system may employ a hierarchical namespace to store files. Furthermore, the directory group may employ a plurality of locks to control access to objects (e.g., files and directories) in each directory.

23 Claims, 9 Drawing Sheets

U.S. PATENT DOCUMENTS

| | | | |
|---|---|---|---|
| 5,692,178 A * | 11/1997 | Shaughnessy | 707/8 |
| 5,745,902 A | 4/1998 | Miller et al. | |
| 5,758,359 A | 5/1998 | Saxon | |
| 5,778,395 A | 7/1998 | Whiting et al. | |
| 5,794,042 A | 8/1998 | Terada et al. | |
| 5,812,776 A | 9/1998 | Gifford | |
| 5,873,085 A | 2/1999 | Enoki et al. | |
| 5,901,227 A | 5/1999 | Perlman | |
| 5,907,673 A | 5/1999 | Hirayama et al. | |
| 5,909,540 A | 6/1999 | Carter et al. | |
| 5,913,217 A | 6/1999 | Alger et al. | |
| 5,915,096 A | 6/1999 | Rosenzweig et al. | |
| 5,950,198 A | 9/1999 | Falls et al. | |
| 5,953,729 A | 9/1999 | Cabrera et al. | |
| 5,968,121 A | 10/1999 | Logan et al. | |
| 5,974,141 A | 10/1999 | Saito | |
| 5,978,805 A | 11/1999 | Carson | |
| 5,991,414 A | 11/1999 | Garay et al. | |
| 5,991,771 A | 11/1999 | Falls et al. | |
| 6,023,506 A | 2/2000 | Ote et al. | |
| 6,026,474 A | 2/2000 | Carter et al. | |
| 6,029,168 A | 2/2000 | Frey | |
| 6,032,151 A | 2/2000 | Arnold et al. | |
| 6,032,216 A | 2/2000 | Schmuck et al. | |
| 6,047,283 A | 4/2000 | Braun | |
| 6,067,545 A | 5/2000 | Wolff | |
| 6,098,079 A | 8/2000 | Howard | |
| 6,122,378 A | 9/2000 | Yoshiura et al. | |
| 6,122,631 A | 9/2000 | Berbec et al. | |
| 6,145,094 A | 11/2000 | Shirriff et al. | |
| 6,160,552 A | 12/2000 | Wilsher et al. | |
| 6,167,449 A | 12/2000 | Arnold et al. | |
| 6,173,293 B1 * | 1/2001 | Thekkath et al. | 707/201 |
| 6,185,569 B1 | 2/2001 | East et al. | |
| 6,185,574 B1 | 2/2001 | Howard et al. | |
| 6,208,659 B1 | 3/2001 | Govindarajan et al. | |
| 6,233,606 B1 | 5/2001 | Dujari | 709/213 |
| 6,240,416 B1 | 5/2001 | Immon et al. | |
| 6,259,723 B1 | 7/2001 | Miyashita | |
| 6,260,040 B1 | 7/2001 | Kauffman et al. | |
| 6,263,348 B1 | 7/2001 | Kathrow et al. | |
| 6,269,080 B1 | 7/2001 | Kumar | |
| 6,295,538 B1 | 9/2001 | Cooper et al. | |
| 6,324,544 B1 | 11/2001 | Alam et al. | |
| 6,338,057 B1 | 1/2002 | Weeks | |
| 6,345,288 B1 | 2/2002 | Reed et al. | |
| 6,370,547 B1 | 4/2002 | Eftink | |
| 6,389,433 B1 | 5/2002 | Bolosky et al. | |
| 6,405,315 B1 | 6/2002 | Burns et al. | |
| 6,415,280 B1 | 7/2002 | Farber et al. | |
| 6,415,372 B1 | 7/2002 | Zakai et al. | |
| 6,463,535 B1 | 10/2002 | Drews | |
| 6,466,978 B1 | 10/2002 | Mukherjee et al. | |
| 6,477,544 B1 | 11/2002 | Bolosky et al. | |
| 6,484,186 B1 | 11/2002 | Rungta | |
| 6,484,204 B1 | 11/2002 | Rabinovich | |
| 6,493,804 B1 * | 12/2002 | Soltis et al. | 711/152 |
| 6,510,426 B1 | 1/2003 | Cohen et al. | |
| 6,516,350 B1 | 2/2003 | Lumelsky et al. | |
| 6,522,423 B2 | 2/2003 | Cohen et al. | |
| 6,535,894 B1 | 3/2003 | Schmidt et al. | |
| 6,556,998 B1 | 4/2003 | Mukherjee et al. | |
| 6,560,706 B1 | 5/2003 | Carbajal et al. | |
| 6,577,734 B1 | 6/2003 | Etzel et al. | 380/277 |
| 6,671,821 B1 | 12/2003 | Castro et al. | |
| 6,704,730 B2 | 3/2004 | Moulton et al. | |
| 6,711,559 B1 | 3/2004 | Kogota et al. | |
| 6,718,360 B1 | 4/2004 | Jones et al. | |
| 6,721,880 B1 | 4/2004 | Pike | |
| 6,725,373 B2 | 4/2004 | Carbajal et al. | |
| 6,738,797 B1 | 5/2004 | Martin | |
| 6,742,114 B1 | 5/2004 | Carter et al. | |
| 6,748,538 B1 | 6/2004 | Chan et al. | |
| 6,751,627 B2 | 6/2004 | Sternin | |
| 6,766,367 B1 | 7/2004 | Stevenson et al. | |
| 6,775,703 B1 * | 8/2004 | Burns et al. | 709/228 |
| 6,788,769 B1 | 9/2004 | Waites | |
| 6,928,426 B2 | 8/2005 | Dake | |
| 6,947,556 B1 | 9/2005 | Matyas, Jr. et al. | |
| 6,952,737 B1 | 10/2005 | Coates et al. | |
| 6,988,124 B2 | 1/2006 | Douceur et al. | |
| 6,990,578 B1 | 1/2006 | O'Brien et al. | |
| 6,993,653 B1 | 1/2006 | Guski et al. | |
| 6,996,714 B1 | 2/2006 | Halasz et al. | |
| 7,000,141 B1 | 2/2006 | Karlsson et al. | |
| 7,010,689 B1 | 3/2006 | Matyas, Jr. et al. | |
| 7,043,637 B2 | 5/2006 | Bolosky et al. | |
| 7,051,028 B2 | 5/2006 | Shi et al. | |
| 7,146,377 B2 | 12/2006 | Nowicki et al. | |
| 7,152,165 B1 | 12/2006 | Maheshwari et al. | |
| 7,249,382 B2 | 7/2007 | Kawell, Jr. et al. | |
| 7,272,630 B2 | 9/2007 | Douceur et al. | |
| 7,296,039 B2 * | 11/2007 | Chandrasekaran et al. | 707/203 |
| 2001/0039548 A1 | 11/2001 | Shinkai et al. | |
| 2002/0016174 A1 | 2/2002 | Gibson et al. | |
| 2002/0038296 A1 | 3/2002 | Margolus et al. | |
| 2002/0066022 A1 | 5/2002 | Calder et al. | |
| 2002/0073082 A1 | 6/2002 | Duvillier et al. | |
| 2002/0088011 A1 | 7/2002 | Lamkin et al. | 725/142 |
| 2002/0095590 A1 | 7/2002 | Douceur et al. | 713/190 |
| 2002/0097878 A1 | 7/2002 | Ito et al. | |
| 2002/0099784 A1 | 7/2002 | Tran | |
| 2002/0103818 A1 | 8/2002 | Amberden | |
| 2002/0111996 A1 | 8/2002 | Jones et al. | |
| 2003/0028519 A1 | 2/2003 | Burgess | |
| 2003/0046533 A1 | 3/2003 | Olkin et al. | 713/152 |
| 2003/0070071 A1 | 4/2003 | Riedel et al. | |
| 2003/0088515 A1 | 5/2003 | Cooper et al. | |
| 2003/0135588 A1 | 7/2003 | Minborg et al. | |
| 2004/0068652 A1 | 4/2004 | Carpentier et al. | |
| 2004/0078596 A1 | 4/2004 | Kent, Jr. et al. | |
| 2004/0111608 A1 | 6/2004 | Oom Ternudo de Castro et al. | |
| 2004/0143743 A1 | 7/2004 | Margolus et al. | |
| 2004/0249902 A1 | 12/2004 | Tadayon et al. | |
| 2005/0071315 A1 | 3/2005 | Douceur et al. | |
| 2005/0071330 A1 | 3/2005 | Douceur et al. | |
| 2005/0071339 A1 | 3/2005 | Douceur et al. | |
| 2005/0071340 A1 | 3/2005 | Douceur et al. | |
| 2005/0131961 A1 | 6/2005 | Margolus et al. | |
| 2005/0172124 A1 | 8/2005 | Carpentier et al. | |
| 2005/0222994 A1 | 10/2005 | Douceur et al. | |
| 2005/0246393 A1 | 11/2005 | Coates et al. | |
| 2006/0129807 A1 | 6/2006 | Halasz et al. | |

FOREIGN PATENT DOCUMENTS

| | | |
|---|---|---|
| EP | 1052805 | 11/2000 |

OTHER PUBLICATIONS

A. Sweeny et al., "Scalability in the XFS File System," USENIX Annual Technical Conference, 15 pages, 1996.

C Plaxton et al., "Accessing Nearby Copies of Replicated Objects in a Distributed Environment," Theory of Computing Systems, pp. 32:241-280, 1999.

C. Plaxton et al., "Accessing Nearby Copies of Replicated Objects in a Distributed Environment," Proceedings of the 9th Annual ACM Symposium on Parallel Algorithms and Architectures, pp. 311-320, 1997.

C. Thekkath et al., "Frangipani: A Scalable Distributed File System," 16th ACM Symposium on Operating Systems Principles, pp. 224-237, 1997.

Cheriton David et al., Decentralizing a Global Naming Seriice for Improved Performance and Fault Tolerance, May 1989, pp. 147-183.

D. Mazieres et al., "Seperating Key Management from File System Security," 17th ACM Symposium on Operating Systems Principles, pp. 124-4139, Dec. 1999.

D.L. McCue et al., "Computing Replica Placement in Distributed Systems" IEEE Second Workshop on Replicated Data, pp. 58-61, Nov. 1992.

E. Adar and B. Huberman, "Fress Riding on Gnutella," Xerox PARC Technical Report, pp. 1-22, Aug. 2000.

E. Lee et al., "Petal: Distributed Virtual Disks," Seventh International Conference on Architectural Support for Programming Languages and Operating Systems, pp. 84-92, Oct. 1996.

Evans, Matt, FTFS: The Design of a Fault Tolerant Distributed File-System, May 2000, pp. 1-49.

G Cabri et al., "Experience of Adaptive Replication in Distributed File Systems," 22nd IEEE Euromicro, 10 pages, Sep. 1996.

I. Clarke et al., "Freenet: A Distributed Anonymous Information Storage and Retrieval System," ICSI Workshop on Design Issues in Anonymity and Unobservability, 21 pages, Jul. 2000.

J Wylie et al., "Survivable Information Storage Systems," IEEE Computer, pp. 33(8):61-68, Aug. 2000.

J. Douceur et al., "A Large-Scale Study of File-System Contents," Sigmetrics, pp. 59-70, May 1999.

J. Howard et al., "Scale and Performance in a Distributed File System," ACM Transactions on Computer Systems, pp. 51-81, Feb. 1988.

J. Kistler et al., "Disconnected Operation in the Coda File System," ACM Transactions on Computer Systems, V 10 N 1, pp. 3-25, Feb. 1992.

J. Kubiatowicz et al., "OceanStore: An Architecture for Global-Scale Persistent Storage," Proceedings of the Ninth International Conference on Architectural Support for Programming Languages and Operating Systems, 12 pages, Nov. 2000.

J.D. Saltzer et al., "The Protection of Information in Computer Systems," Proceedings of the IEEE, 63(9), pp. 1278-1308, Sep. 1975.

L. Fan et al., "Summary Cache: A Scalable Wide-Area Web Cache Sharing Protocol," ACM SIGCOMM, pp. 254-265, 1998.

M Castro et al., "Proactive Recovery in a Byznatine-Fault-Tolerant System," 4th Symposium on Operating Systems Design and Implmentation, pp. 273-287, Oct. 2000.

M. Castro et al., "Practical Byzantine Fauyt Tolerance," Proceedings of the Third Symposium on Operating Systems Design and Implementation, 14 pages, Feb. 1999.

M.K. McKusick et al., "A Fast File System for Unix" ACM Transactions on Computer Sytems, V 2 N 3, pp. 181-197, Aug. 1984.

R. Anderson, "The Eternity Service," PRAGO-CRYPT, pp. 242-252, Oct. 1996.

R. Sandberg et al., "Design and Implementation of the Sun Network Filesystem," Summer USENIX Conference, pp. 119-130, Jun. 1985.

R. T. Reich et al., "S.M.A.R.T. Phase-II" No. WP-9803-001, Maxtor Corporation, 3 pages, Feb. 1998.

T. Anderson et al., Serverless Network File Systems, 15th Symposium on Operating Systems Principles, pp. 109-126, Dec. 1995.

The OceanStore Project web pages, http://ocenstore.cs.berkeley.edu/info/overview.html, 2 pages, last modified Jul. 8, 2002.

W Bolosky et al., "Single Instance Storage in Windows 2000," Proceedings of the 4th USENIX Windows Systems Symposium, pp. 13-24, Aug. 2000.

W. Bolosky et al., "Feasibility of a Serverless Distributed File System Depolyed on an Existing Set of Desktop PCs," Proceedings of the International Conference on Measurement and Modeling of Compter Systems, pp. 34-43, Jun. 17-21, 2000.

W. Vogels, "File system usage in Windows NT 4.0," 17th ACM Symposium on Operating Systems Principles, pp. 93-109, Dec. 1999.

ISU: http://www.isu.edu/departments/comcom/unix/workshop/shell.html, "Section 4: The UNIX Shell", 3 pages.

From the Internet http://www.isu.edu/departments/comcom/ünix.workshop/, retrieved Sep. 28, 2005.

Federal Information Processing Standards Publication 186: Digital Signature. Standard (DSS). 1994.

Borg, Digital Signatures Keep Cyberstreets Safe for Shoppers, Computer Technology Review, vol. 16, No. 2, Feb. 1996 p. 1.

Hu, Some Thoughts on Agent Trust and Delegation, Available at http://www.cs.nccu.edu.tw/jong, 2001. pp. 489-496.

Ferbrache, "A Pathology of Computer Viruse", Springer-Verlag London Limited, 1992, pp. 1-6.

European Search Report For European Patent Application No. 02005657.8 Mailed On Nov. 13, 2007, pp. 9.

Coulouris, et al., Translated by Tadanori et al., Distributed Systems:, Japan, Denkishoin Co., Ltd., Second Edition, Oct. 31, 1997, pp. 785-827.

Miller et al, "Strong Security for Distributed File Systems", 2001 IEEE, pp. 34-40.

* cited by examiner

SERVERLESS DISTRIBUTED FILE SYSTEM

RELATED PATENTS AND APPLICATIONS

This is a continuation of application Ser. No. 10/005,629, filed Dec. 5, 2001, entitled "A Serverless Distributed File System", now issued U.S. Pat. No. 7,062,490, which is hereby incorporated by reference herein, and which claims the benefit of U.S. Provisional Application No. 60/278,905, filed Mar. 26, 2001, entitled "A Serverless Distributed File System in an Untrusted Environment", to Atul Adya, Gerald Cermak, John R. Douceur, Marvin Theimer, Roger Wattenhofer, and William J. Bolosky, which is hereby incorporated by reference.

TECHNICAL FIELD

This invention relates to computer networks and file systems, and particularly to a serverless distributed file system.

BACKGROUND

File systems manage files and other data objects stored on computer systems. File systems were originally built into a computer's operating system to facilitate access to files stored locally on resident storage media. As computers became networked, some file storage capabilities were offloaded from individual user machines to special storage servers that stored large numbers of files on behalf of the user machines. When a file was needed, the user machine simply requested the file from the server. In this server-based architecture, the file system was extended to facilitate management of and access to files stored remotely at the storage server over a network.

Today, file storage is migrating toward a model in which files are stored on various networked computers, rather than on a central storage server. The serverless architecture poses new challenges to file systems. One particular challenge concerns managing files that are distributed over many different computers in a manner that allows files to be reliably stored and accessible in spite of varying ones of the computers being inaccessible at any given time, while at the same time preventing access to the files by non-authorized users.

The invention addresses these challenges and provides solutions that are effective for serverless distributed file systems.

SUMMARY

A serverless distributed file system is described herein.

According to one aspect, files and directories are managed within the serverless distributed file system in different manners. Directories are managed using Byzantine-fault-tolerant groups, whereas files are managed without using Byzantine-fault-tolerant groups. This can result in improved performance as a result of storing fewer copies of a file than of the corresponding directory entry.

According to another aspect, the file system employs a hierarchical namespace to store files. The files are spread out across multiple computers, each of which can operate as both a client computer and a server computer, and each of which need not trust the others.

According to another aspect, responsibility for managing one or more directories in the file system are assigned to a directory group. Each member of the directory group is a computer participating in the system, and the directory group employs a plurality of locks to control access to objects (e.g., files and directories) in each directory. The locks include a first set of locks to control opening of the objects, and a second set of locks to control access to the data in the objects.

BRIEF DESCRIPTION OF THE DRAWINGS

The same numbers are used throughout the document to reference like components and/or features.

DETAILED DESCRIPTION

The following discussion is directed to a symbiotic, serverless, distributed file system that runs on multiple networked computers and stores files across the computers rather than on a central server or cluster of servers. The symbiotic nature implies that the machines cooperate but do not completely trust one another. The file system does not manage the disk storage directly, but rather relies on existing file systems on local machines, such as those file systems integrated into operating systems (e.g., the Windows NT® file system).

The discussions herein make reference to public key cryptography, encryption, and digital signatures. Generally, public key cryptography refers to the use of public and private keys, collectively referred to as a key pair. An entity (e.g., a user, a software application, etc.) keeps the private key secret, but makes the public key available to others. Data, typically referred to as plaintext, can be encrypted using an encryption algorithm and the public key in such a way that the encrypted result (typically referred to as ciphertext) cannot be easily decrypted without knowledge of the corresponding private key, but can be relatively easily decrypted with knowledge of the corresponding private key. Similarly, data can be digitally signed using an encryption algorithm and the private key in such a way that the signature can be easily verified using the corresponding public key, but a signature cannot easily be generated without the private key. The discussions herein assume a basic understanding of cryptography by the reader. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

Serverless Distributed File System

Figure 1:
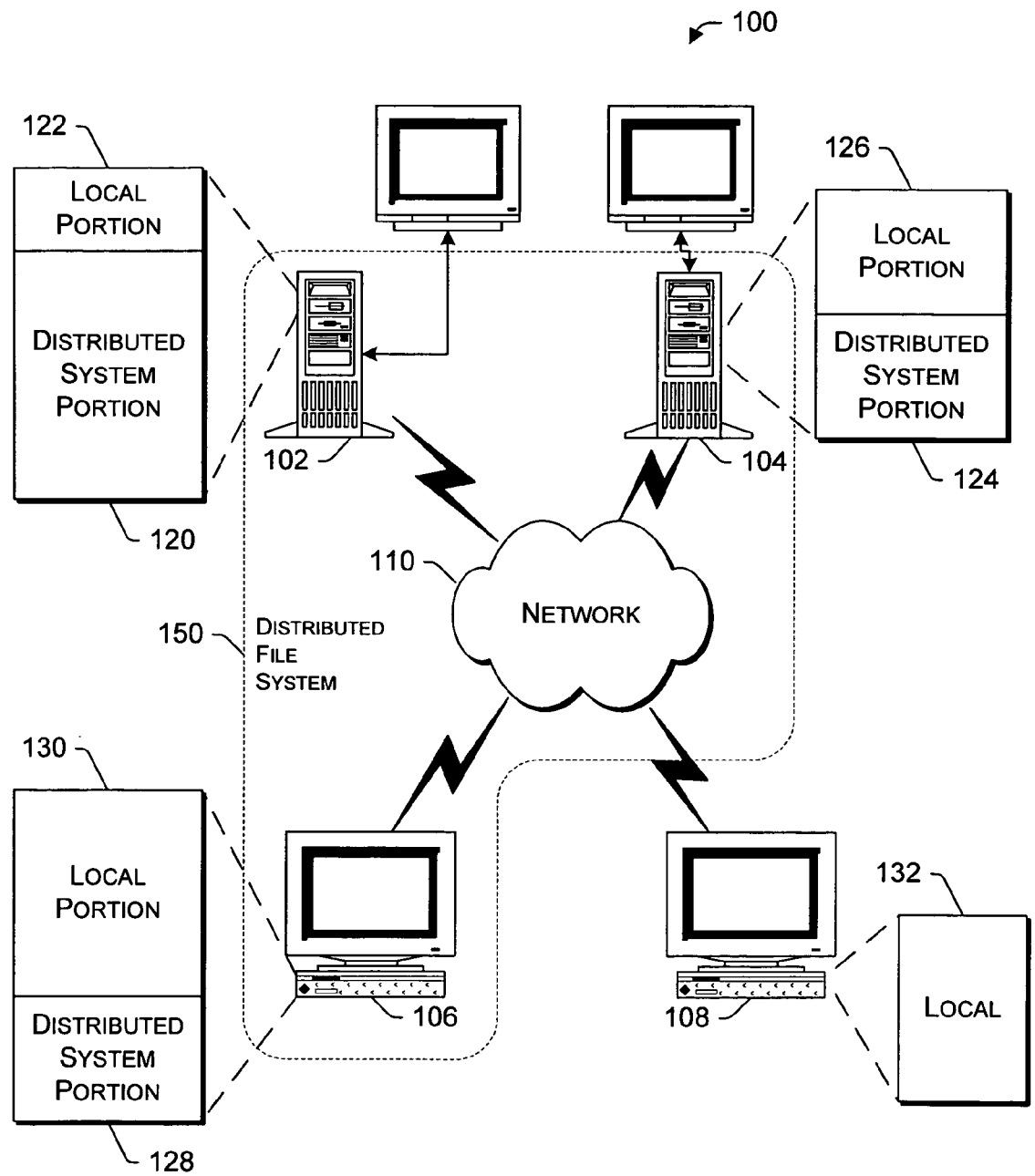
FIG. 1 illustrates an exemplary network environment that supports a serverless distributed file system.

FIG. 1 illustrates an exemplary network environment 100 that supports a serverless distributed file system. Four client computing devices 102, 104, 106, and 108 are coupled together via a data communications network 110. Although four computing devices are illustrated, different numbers (either greater or fewer than four) may be included in network environment 100.

Network 110 represents any of a wide variety of data communications networks. Network 110 may include public portions (e.g., the Internet) as well as private portions (e.g., an internal corporate Local Area Network (LAN)), as well as combinations of public and private portions. Network 110 may be implemented using any one or more of a wide variety of conventional communications media including both wired and wireless media. Any of a wide variety of communications protocols can be used to communicate data via network 110, including both public and proprietary protocols. Examples of such protocols include TCP/IP, IPX/SPX, NetBEUI, etc.

Computing devices 102-108 represent any of a wide range of computing devices, and each device may be the same or different. By way of example, devices 102-108 may be desktop computers, laptop computers, handheld or pocket computers, personal digital assistants (PDAs), cellular phones, Internet appliances, consumer electronics devices, gaming consoles, and so forth.

Two or more of devices 102-108 operate to implement a serverless distributed file system. The actual devices participating in the serverless distributed file system can change over time, allowing new devices to be added to the system and other devices to be removed from the system. Each device 102-106 that implements (participates in) the distributed file system has portions of its mass storage device(s) (e.g., hard disk drive) allocated for use as either local storage or distributed storage. The local storage is used for data that the user desires to store on his or her local machine and not in the distributed file system structure. The distributed storage portion is used for data that the user of the device (or another device) desires to store within the distributed file system structure.

In the illustrated example of FIG. 1, certain devices connected to network 110 have one or more mass storage devices that include both a distributed portion and a local portion. The amount allocated to distributed or local storage varies among the devices. For example, device 102 has a larger percentage allocated for a distributed system portion 120 in comparison to the local portion 122; device 104 includes a distributed system portion 124 that is approximately the same size as the local portion 126; and device 106 has a smaller percentage allocated for a distributed system portion 128 in comparison to the local portion 130. The storage separation into multiple portions may occur on a per storage device basis (e.g., one hard drive is designated for use in the distributed system while another is designated solely for local use), and/or within a single storage device (e.g., part of one hard drive may be designated for use in the distributed system while another part is designated for local use). The amount allocated to distributed or local storage may vary over time. Other devices connected to network 110, such as computing device 108, may not implement any of the distributed file system and thus do not have any of their mass storage device(s) allocated for use by the distributed system. Hence, device 108 has only a local portion 132.

A distributed file system 150 operates to store one or more copies of files on different computing devices 102-106. When a new file is created by the user of a computer, he or she has the option of storing the file on the local portion of his or her computing device, or alternatively in the distributed file system. If the file is stored in the distributed file system 150, the file will be stored in the distributed system portion of the mass storage device(s) of one or more of devices 102-106. The user creating the file typically has no ability to control which device 102-106 the file is stored on, nor any knowledge of which device 102-106 the file is stored on. Additionally, replicated copies of the file will typically be saved, allowing the user to subsequently retrieve the file even if one of the computing devices 102-106 on which the file is saved is unavailable (e.g., is powered-down, is malfunctioning, etc.).

The distributed file system 150 is implemented by one or more components on each of the devices 102-106, thereby obviating the need for any centralized server to coordinate the file system. These components operate to determine where particular files are stored, how many copies of the files are created for storage on different devices, and so forth. Exactly which device will store which files depends on numerous factors, including the number of devices in the distributed file system, the storage space allocated to the file system from each of the devices, how many copies of the file are to be saved, a cryptographically secure random number, the number of files already stored on the devices, and so on. Thus, the distributed file system allows the user to create and access files (as well as folders or directories) without any knowledge of exactly which other computing device(s) the file is being stored on.

Distributed file system 150 is designed to be scalable to support large numbers of computers within system 150. Protocols and data structures used by the components on the devices in system 150 are designed so as not to be proportional to the number of computers in the system, thereby allowing them to readily scale to large numbers of computers.

The files stored by the file system are distributed among the various devices 102-106 and stored in encrypted form. When a new file is created, the device on which the file is being created encrypts the file prior to communicating the file to other device(s) for storage. The directory entry (which includes the file name) for a new file is also communicated to other device(s) for storage, which need not be (and typically will not be) the same device(s) on which the encrypted file is stored. Additionally, if a new folder or directory is created, the directory entry (which is includes the folder name or directory name) is also communicated to the other device(s) for storage. As used herein, a directory entry refers to any entry that can be added to a file system directory, including both file names and directory (or folder) names.

The distributed file system 150 is designed to prevent unauthorized users from reading data stored on one of the devices 102-106. Thus, a file created by device 102 and stored on device 104 is not readable by the user of device 104 (unless he or she is authorized to do so). In order to implement such security, the contents of files as well as all file and directory names in directory entries are encrypted, and only authorized users are given the decryption key. Thus, although device 104 may store a file created by device 102, if the user of device 104 is not an authorized user of the file, the user of device 104 cannot decrypt (and thus cannot read) either the contents of the file or the file name in its directory entry.

The distributed file system 150 employs a hierarchical storage structure, having one or more namespace roots as well as multiple subtrees under each namespace root. The management of different subtrees can be delegated to different groups of computers, thereby preventing the computers managing a namespace root or a particular subtree(s) from becoming overburdened.

The distributed file system 150 also manages the storage of files and the directory entries corresponding to those files differently. A file being stored in system 150 is replicated and saved on multiple different computers in the system. Additionally, a directory entry is generated for the file and is also saved on multiple different computers in the system. A larger number of directory entry copies are saved than are file copies. In one implementation, the directory entries are stored on computers that are part of a Byzantine-fault-tolerant group, as discussed in more detail below.

The distributed file system 150 also employs a directory and file lock mechanism that allows control over who may read or write directories and files. When used with computers in a Byzantine group, the lock mechanism employed attempts to increase performance by increasing the number of operations that can be performed locally without requiring action by the directory group, as discussed in more detail below.

Every computer 102-106 in distributed file system 150 can have three functions: it can be a client for a local user, it can be a repository for encrypted copies of files stored in the system, and it can be a member of a group of computers that maintain one or more directories.

Generally, when a user on a computer 102-106 opens a file in a given directory, the computer sends a request to a set of computers that collectively manage that directory (called a "Byzantine group" or "directory group") using a Byzantine-fault-tolerant protocol. The Byzantine group grants a file lock to the computer, allowing it to make local updates to the file (if it is a write lock) and to subsequently push those updates back to the Byzantine group. If the computer has accessed this file recently, it will probably have an encrypted copy of the file contents in a local cache, so it need only retrieve the cached copy and decrypt it, after which it can begin reading or writing the file. If it has not accessed the current version of the file recently, the computer retrieves an encrypted copy of the file from one of the computers that stores the file. The information about which computers hold current copies is provided by the Byzantine group along with the lock grant; if one or more of the file-storage computers are down, the computer retrieves the file from a different one. The Byzantine group also provides a cryptographic hash of the file contents that the computer uses to validate the file it fetches.

File Encryption

The files are encrypted using a technology known as "convergent encryption". Convergent encryption has the following two properties. First, if two or more encryptable objects are identical, then even if different encryption keys are used to encrypt them to provide individual cipher objects, one does not need to have access to any of the encryption keys to determine from an examination of the cipher objects that the encryptable objects are identical. Second, if two or more encryptable objects are identical but are encrypted with different encryption keys, the total space that is required to store all of the cipher objects is proportional to the space that is required to store a single encryptable object, plus a constant amount of storage for each distinct encryption key.

Generally, according to convergent encryption, a file F (or any other type of encryptable object) is initially hashed using a one-way hashing function h (e.g., SHA, MD5, etc.) to produce a hash value h(F). The file F is then encrypted using a symmetric cipher (e.g., RC4, RC2, etc.) with the hash value as the key, or $E_{h(F)}(F)$. Next, read access control entries are created for each authorized user who is granted read access to the encrypted file. Write access control is governed by the directory server that stores the directory entry for the file. The read access control entries are formed by encrypting the file's hash value h(F) with any number of keys $K_1, K_2, \ldots, K_m$, to yield $E_{K1}(h(F)), E_{K2}(h(F)), \ldots, E_{Km}(h(F))$. In one implementation, each key K is the user's public key of a public/private key pair for an asymmetric cipher (e.g., RSA).

With convergent encryption, one encrypted version of the file is stored and replicated among the serverless distributed file system 150. Along with the encrypted version of the file is stored one or more access control entries depending upon the number of authorized users who have access. Thus, a file in the distributed file system 150 has the following structure:

$$[E_{h(F)}(F), <E_{K1}(h(F))>, <E_{K2}(h(F))>, \ldots, <E_{Kn}(h(F))>]$$

One advantage of convergent encryption is that the encrypted file can be evaluated by the file system to determine whether it is identical to another file without resorting to any decryption (and hence, without knowledge of any encryption keys). Unwanted duplicative files can be removed by adding the authorized user(s) access control entries to the remaining file. Another advantage is that the access control entries are very small in size, on the order of bytes as compared to possibly gigabytes for the encrypted file. As a result, the amount of overhead information that is stored in each file is small. This enables the property that the total space used to store the file is proportional to the space that is required to store a single encrypted file, plus a constant amount of storage for each additional authorized reader of the file.

For more information on convergent encryption, the reader is directed to co-pending U.S. patent application Ser. No. 09/565,821, entitled "Encryption Systems and Methods for Identifying and Coalescing Identical Objects Encrypted with Different Keys", which was filed May 5, 2000, in the names of Douceur et al., and is commonly assigned to Microsoft Corporation. This application is hereby incorporated by reference.

Directory Entry Encryption

The file and directory names within directory entries are encrypted using a process referred to as "exclusive encryption". Exclusive encryption allows the file and directory names within directory entries to be stored in an encrypted form, thereby preventing unauthorized users from improperly gaining any information based on the name of a file or directory. Additionally, exclusive encryption has the following three properties. First, no two encrypted entries in a directory will decrypt to the same name. Second, all encrypted entries in a directory decrypt to syntactically legal names. Third, the directory group that maintains the directory does not have access to the plaintext names of the entries. Thus, file system 150 is able to ensure both that no two entries in a directory are encryptions of the same name and that all entries in a directory are encryptions of syntactically legal names, while at the same time ensuring that the device maintaining the directory does not have access to the plaintext names of the entries.

Generally, according to exclusive encryption, a plaintext name (the file or directory name within the directory entry) is mapped to a new name. The mapped name is optionally decasified into a decasified (case-insensitive) name and corresponding case information, allowing duplicate name detection to be case-insensitive. The mapped (and optionally decasified) name is then encoded and encrypted. This encrypted name (and optionally accompanying case information) are forwarded to the directory group that is responsible for managing the directory entry (e.g., based on pathname, as discussed in more detail below).

For more information on exclusive encryption, the reader is directed to co-pending U.S. patent application Ser. No. 09/764,962, entitled "Exclusive Encryption for a Secure Directory Service", which was filed Jan. 17, 2001, in the names of Douceur et al., and is commonly assigned to Microsoft Corporation. This application is hereby incorporated by reference.

File Format

The file format for serverless distributed file system 150 of FIG. 1 is composed of two parts: a primary data stream and a metadata stream. The primary data stream contains a file that is divided into multiple blocks. Each block is encrypted using a symmetric cipher (e.g., RC4) and a hash of the block as the encryption key. The metadata stream contains a header, a structure for indexing the encrypted blocks in the primary data stream, and some user information.

The indexing tree structure defines leaf nodes for each of the blocks. Each leaf node consists of an access value used for decryption of the associated block and a verification value used to verify the encrypted block independently of other blocks. In one implementation, the access value is formed by hashing the file block and encrypting the resultant hash value using a symmetric cipher and a randomly generated key. The key is then encrypted using an asymmetric cipher (e.g., RSA) and the user's public key as the encryption key. The verification value is formed by hashing the associated encrypted block using a one-way hash function (e.g., SHA).

Depending on the size of the file, the indexing structure may include intermediate nodes formed by grouping the leaf nodes into tree blocks and computing hash values of each tree block. These intermediate nodes can again be segmented into blocks and each block hashed to form the next nodes. This can be repeated as many times as desired until reaching a root node. The root node is then hashed, and the hash value is used along with the metadata header and user information to produce a verification value for the entire file. In one implementation, the whole-file verification value is signed with a user's signature. Alternatively, a file may be constructed without such signatures.

The file format supports verification of individual file blocks without knowledge of the randomly generated key or any user keys. To verify a block of the file, the file system optionally evaluates the signature on whole file verification value (if one exists), checks that the whole-file verification value matches the hash of the root block, metadata header and user information and then traverses the tree to the appropriate leaf node associated with a target block to be verified. The file system hashes the target block and if the hash matches the access value contained in the leaf node, the block is authentic.

The file format further supports reading from and writing to individual blocks without interfering with other blocks. The file format is also conducive for sparse files that have vast areas of non-data.

For more information on the file format, the reader is directed to co-pending U.S. patent application Ser. No. 09/814,259, entitled "On-Disk File Format for a Serverless Distributed File System", which was filed Mar. 21, 2001, in the names of Bolosky et al., and is commonly assigned to Microsoft Corporation. This application is hereby incorporated by reference.

Computing Device Architecture

Figure 2:
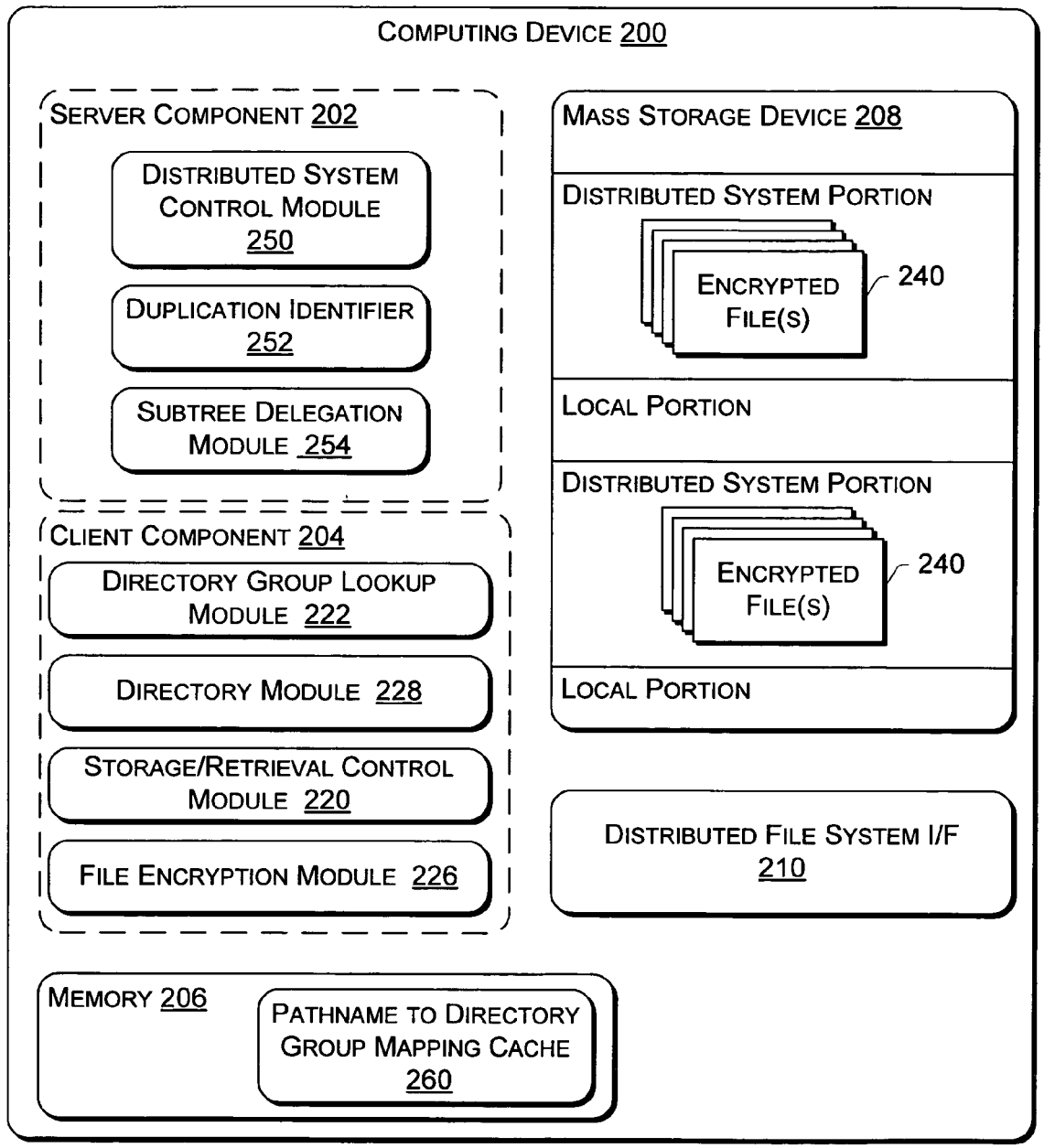
FIG. 2 illustrates logical components of an exemplary computing device that is representative of any one of the devices of FIG. 1 that participate in the distributed file system.

FIG. 2 illustrates logical components of an exemplary computing device 200 that is representative of any one of the devices 102-106 of FIG. 1 that participate in the distributed file system 150. Computing device 200 includes a server component 202, a client component 204, a memory 206, a mass storage device 208, and a distributed file system interface 210. Computing device 200 also typically includes additional components (e.g., a processor), however these additional components have not been shown in FIG. 2 so as not to clutter the drawings. A more general description of a computer architecture with various hardware and software components is described below with reference to FIG. 3.

Memory 206 can be any of a wide variety of conventional volatile and/or nonvolatile memories, such as RAM, ROM, Flash memory, and so on. Mass storage device 208 can be any of a wide variety of conventional nonvolatile storage devices, such as a magnetic disk, optical disk, Flash memory, and so forth. Mass storage device 208 is partitioned into a distributed system portion and a local portion. Although only one mass storage device 208 is illustrated in FIG. 2, computing device 200 may include multiple storage devices 208 (of different types, or alternatively all of the same type).

Computing device 200 is intended to be used in a serverless distributed file system, and as such includes both a server component 202 and client component 204. Server component 202 handles requests when device 200 is responding to a request involving a file or directory entry stored (or to be stored) in storage device 208, while client component 204 handles the issuance of requests by device 200 for files or directories stored (or to be stored) in the distributed file system. Client component 204 and server component 202 operate independently of one another. Thus, situations can arise where the serverless distributed file system 150 causes files being stored by client component 204 to be stored in mass storage device 208 by server component 202.

Client component 204 includes a storage and retrieval control module 220, which along with interface 210, manages access to the serverless distributed file system 150 for the creation, storage, retrieval, reading, writing, modifying, and verifying of files and directories on behalf of computing device 150. Control module 220 uses a directory group lookup module 222 to identify a directory group that is responsible for managing a particular file or directory, a file encryption module 226 to encrypt files, and a directory encryption module 228 to encrypt file and directory names in directory entries. The operation of these modules is discussed in more detail below.

The server component 202 includes a distributed system control module 250, a duplication identifier 252, and a subtree delegation module 254. Distributed system control module 250 manages access to the encrypted files 240. It communicates with mass storage device 208 to store and retrieve encrypted files 240. Distributed system control module 250 also maintains a record of the directory entries (not shown) in memory 206 and/or mass storage device 208 that are stored at computing device 200 (or alternatively that are stored elsewhere in the serverless distributed file system). Subtree delegation module 254 operates to delegate subtrees to other directory groups, as discussed in more detail below.

Duplication identifier 252 helps identify identical encrypted files in the distributed file system. When the duplication identifier 252 finds a duplication that is not an intentional replication for fault tolerant purposes, the duplication identifier 252 notifies the control module 250, which then eliminates the duplicated file and adds the access control entries to the eliminated file to the remaining file.

Figure 3:
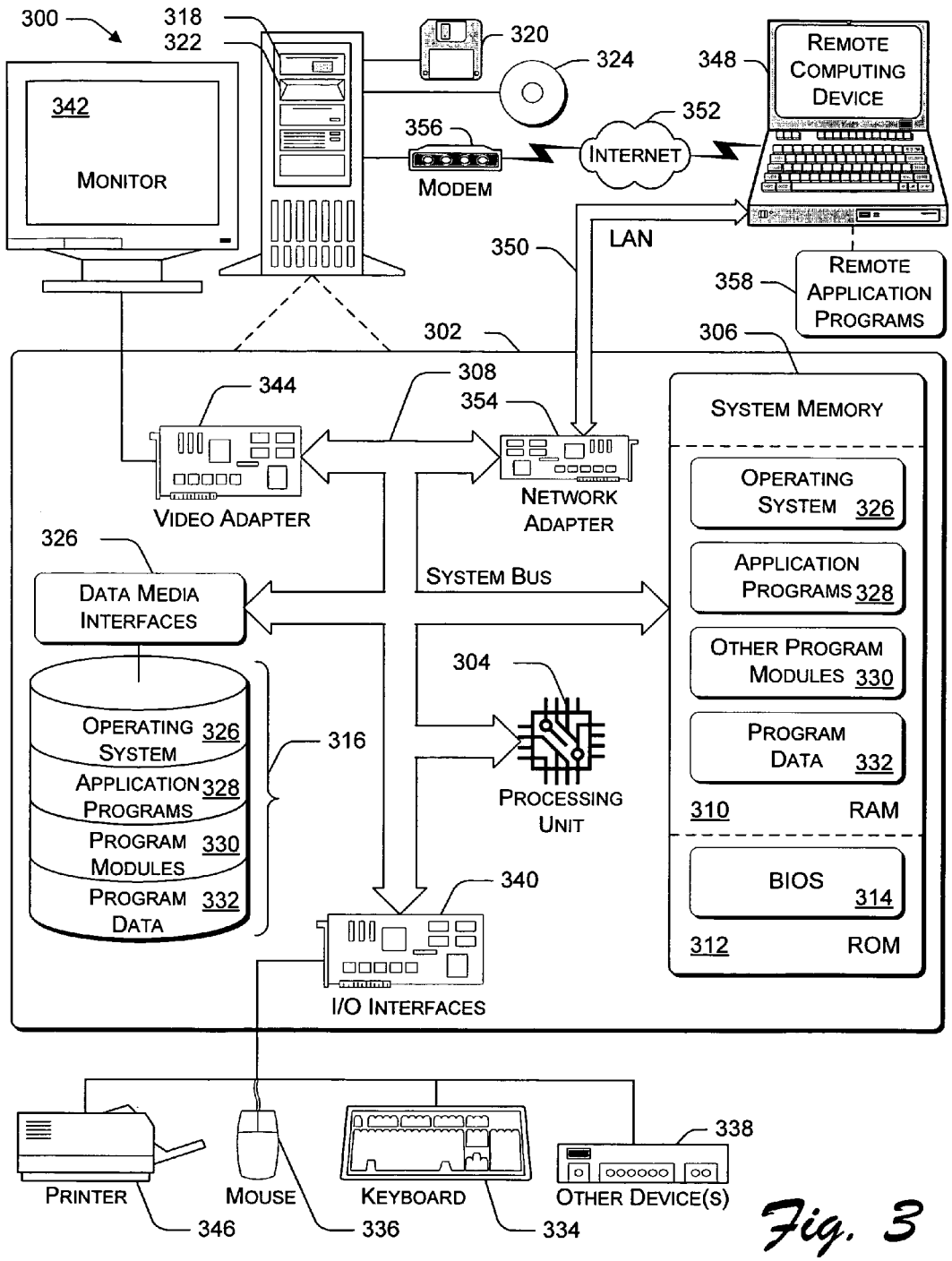
FIG. 3 illustrates a more general computer environment which is used to implement the distributed file system of FIG. 1.

FIG. 3 illustrates a more general computer environment 300, which is used to implement the distributed file system. The computer environment 300 is only one example of a computing environment and is not intended to suggest any limitation as to the scope of use or functionality of the computer and network architectures. Neither should the computer environment 300 be interpreted as having any requirement regarding the inclusion (or exclusion) of any components or the coupling or combination of components illustrated in the exemplary computer environment 300.

Computer environment 300 includes a general-purpose computing device in the form of a computer 302. The components of computer 302 can include, by are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

An implementation of the distributed file system 150 may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of the file format for the encrypted files may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Hierarchical Storage Structure

Figure 4:
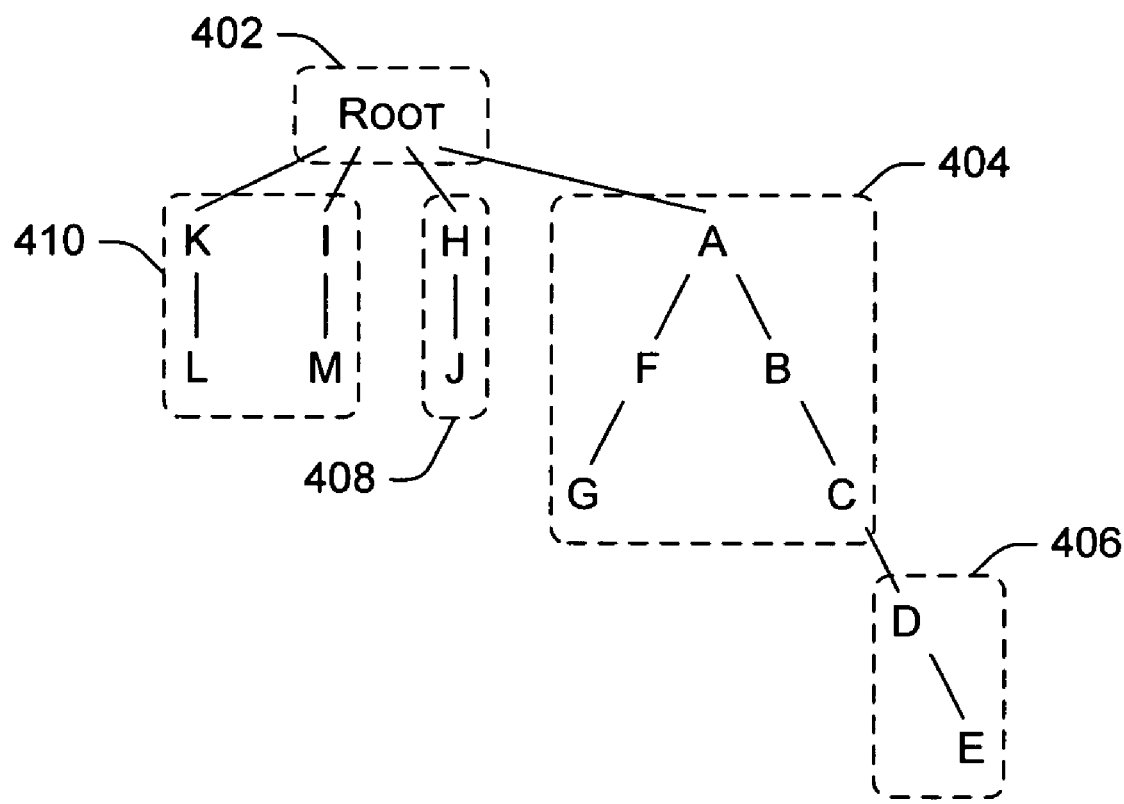
FIG. 4 illustrates an exemplary hierarchical namespace including a namespace root having multiple subtrees.

Distributed file system 150 employs a hierarchical file storage structure including one or more namespace roots each capable of supporting one or more subtrees of directories or folders, and with each subtree being capable of supporting one or more additional subtrees. A directory can be viewed as a simulated file folder, being capable of holding zero or more files and/or zero or more other directories. A subtree refers to one or more directories and includes a root (it may also include a namespace root), and has the property that the path from the subtree root to all members of the subtree is within the subtree itself. FIG. 4 illustrates an exemplary hierarchical namespace 400 including a namespace root having multiple subtrees including directories A, B, C, D, E, F, G, H, J, I, M, K, and L. Although many more directories will typically be included in subtrees of a namespace root, only a few have been illustrated in FIG. 4 for ease of explanation.

Each subtree is managed by a group of one or more computers referred to as a directory group. Although discussed herein primarily as directory groups managing subtrees, alternatively one or more directory groups may manage an arbitrary set of directories within the namespace. One or more modules of the computer are responsible for implementing directory services to manage the subtree(s) it is assigned, such as control module 250 of FIG. 2. In one implementation, each directory group is a Byzantine-fault-tolerant group (or simply referred to as a Byzantine group), as discussed in more detail below. However, directory groups need not be Byzantine-fault-tolerant groups, and other groupings can be used.

The solid lines in FIG. 4 illustrate relationships between directories, identifying which directories are sub-directories of which other directories. For example, directory C is a sub-directory of directory B. A directory can also be referred to as the "parent" directory of any of its sub-directories. For example, directory B can be referred to as the parent directory of directory C.

Each dashed box in FIG. 4 illustrates a directory group that manages the directories included within the particular dashed line. Thus, in the example namespace 400, the root namespace is managed by a directory group 402, directories A, B, C, F, and G are managed by a directory group 404, directories D and E are managed by a directory group 406, directories H and J are managed by a directory group 408, and directories K, I, L, and M are managed by a directory group 410.

A directory group managing a particular directory or namespace is responsible for maintaining a directory entry for each file stored in that directory, as well as a directory entry for each sub-directory within the directory. Each directory entry for a file identifies one or more computers in the distributed file system 150 where the file is stored. Each directory entry for a sub-directory identifies the directory group responsible for managing that sub-directory. Directory entries may also contain additional information, such as: creation, modification and access time stamps; read and write access control lists; the set of replica locations; the size of the file; and so forth.

Each directory group is responsible for managing a namespace root and/or one or more subtrees within the namespace. Each directory group is further able to identify one or more additional subtrees and delegate management responsibility for those additional subtrees to another directory group. For example, directories D and E may have originally been managed by directory group 404, but subsequently delegated to directory group 406.

A directory group can decide at any time to delegate a subtree to another directory group. In one implementation, this decision is based on workload, and the directory group decides to delegate a subtree when the group determines that it is becoming overloaded. Various factors can be used by a group to determine when it is becoming overloaded, and in one exemplary implementation each directory group tries to manage a subtree of size approximately equal to the mean count of expected directories per machine (e.g., on the order of 10,000).

The directory group to which the subtree is to be delegated can be determined in a variety of manners. In one implementation, the directory group performing the delegation selects randomly from the computers in distributed file system 150 that it is aware of, and uses those selected computers as the new directory group to which the subtree is to be delegated. Various other factors may weigh into the selection process (e.g., not selecting those computers that have low availability, not selecting those computers that have recently delegated a subtree, etc.).

A directory group is able to delegate a particular subtree by generating a delegation certificate that is digitally signed by one or more members of the directory group. In situations where multiple members sign a delegation certificate, the signature process can take various forms. In one implementation, each member signs its own copy of the delegation certificate. In another implementation, the delegation certificate is recursively signed (e.g., the certificate is signed by one member, and then the digitally signed certificate is signed by another member, etc.). The order in which different members recursively sign the certificate does not matter, so long as the order is known to the verifier when verifying the digital signature (e.g., the verifier may be pre-programmed with the order of signature, or information identifying the order may be included in the certificate). The following illustrates an exemplary certificate recursively signed by four signers:

$$\sigma_{S4}(\sigma_{S3}(\sigma_{S2}(\sigma_{S1}(DC))))$$

where DC represents the delegation certificate being digitally signed, and $\sigma_{Si}(\ )$ indicates that the contents of ( ) have been digitally signed by signer i.

In one implementation, the number of members (computers) in a directory group is dependent on the number of faulty computers that the designer desires to be able to tolerate. As used herein, a faulty computer refers to a computer that is either inaccessible (e.g., the computer has been powered off or is malfunctioning) or that has been corrupted (e.g., a malicious user or program has gained access to the computer and is able to respond to queries inappropriately, such as by not giving proper response or giving improper data). In one specific example, in order to tolerate $f$ faulty computers, a directory group includes $3f+1$ computers. Additionally, in this example, at least $f+1$ computers digitally sign the delegation certificate.

Each namespace root has associated with it a certificate that is obtained from a certification authority (CA). The certification authority is a trusted authority that verifies the creation of the namespace. Each delegation certificate associated with a subtree includes a certificate chain that traces from the current subtree back up through zero or more other subtrees to the namespace root certificate signed by the CA. Thus, each delegation certificate has associated with it multiple certificates that prove it is the authorized directory group for managing the subtree (by establishing a certificate chain back to the certificate signed by the CA).

The delegation certificate can include different components, and in one implementation the delegation certificate includes: (1) an identification of the path being delegated that is below the root of the subtree that is being managed by the directory group performing the delegation; (2) an identification of the root of the subtree delegated to the directory group performing the delegation; (3) an identification of the subtree being delegated; and (4) an identification of the members of the group to which the subtree is being delegated. The identifications of subtrees and path members can vary, and can be the actual directory names (e.g., the names of directories A, B, C, D, etc.) or alternatively identification numbers (e.g., Globally Unique Identifiers (GUIDs)). Identification numbers can be used to avoid the need to re-create delegation certificates in the event that a directory name is changed.

An example of delegation certificates can be seen with reference to FIG. 4. Directory group 402 obtains a certificate from a CA certifying that group 402 has authority to manage the namespace root. This certificate takes the following form:

$$\sigma_{OurCA}(\text{"Root"}, \text{GUID}_{Root}, \text{DG}_{402}) \quad (1)$$

where $\sigma_{OurCA}$ indicates that the certificate has been signed by the CA "OurCA", "Root" is the name of the namespace root, $\text{GUID}_{Root}$ is a globally unique identifier for the namespace root, and $\text{DG}_{402}$ represents the names (or other identifiers) of the members of directory group 402.

When directory group 402 decides to delegate the subtree beginning with directory A to directory group 404, directory group 402 generates a delegation certificate to be passed to the members of directory group 404. This delegation certificate includes certificate (1) above, as well as the following certificate:

$$\sigma_{DG402}(\text{GUID}_{Root}/A, \text{GUID}_A, \text{DG}_{404}) \quad (2)$$

where $\sigma_{DG402}$ indicates that the certificate has been signed by members of directory group 402, $\text{GUID}_{Root}/A$ is the GUID of the subtree's root delegated to directory group 402 ($\text{GUID}_{Root}$) along with the path being delegated to directory group 404 (/A), $\text{GUID}_A$ is a globally unique identifier of the subtree being delegated (that is, the subtree beginning with directory A), and $\text{DG}_{404}$ represents the names (or other identifiers) of the members of directory group 404.

Similarly, when directory group 404 decides to delegate the subtree beginning with directory D to directory group 406, directory group 404 generates a delegation certificate to be passed to the members of directory group 406. This delegation certificate includes certificates (1) and (2) above, as well as the following certificate:

$$\sigma_{DG404}(\text{GUID}_A/B/C/D, \text{GUID}_D, \text{DG}_{406}) \quad (3)$$

where $\sigma_{DG404}$ indicates that the certificate has been signed by members of directory group 404, $\text{GUID}_A/B/C/D$ is the GUID of the subtree's root delegated to directory group 404 ($\text{GUID}_A$) along with the path being delegated to directory group 406 (/B/C/D), $\text{GUID}_D$ is a globally unique identifier of the subtree being delegated (that is, the subtree beginning with directory D), and $\text{DG}_{406}$ represents the names (or other identifiers) of the members of directory group 406.

In the illustrated example, delegation certificates are issued at delegation points rather than for each directory within a particular subtree. For example, a delegation certificate is issued for A (the top directory in the subtree), but not for /A/B or /A/B/C.

Figure 5:
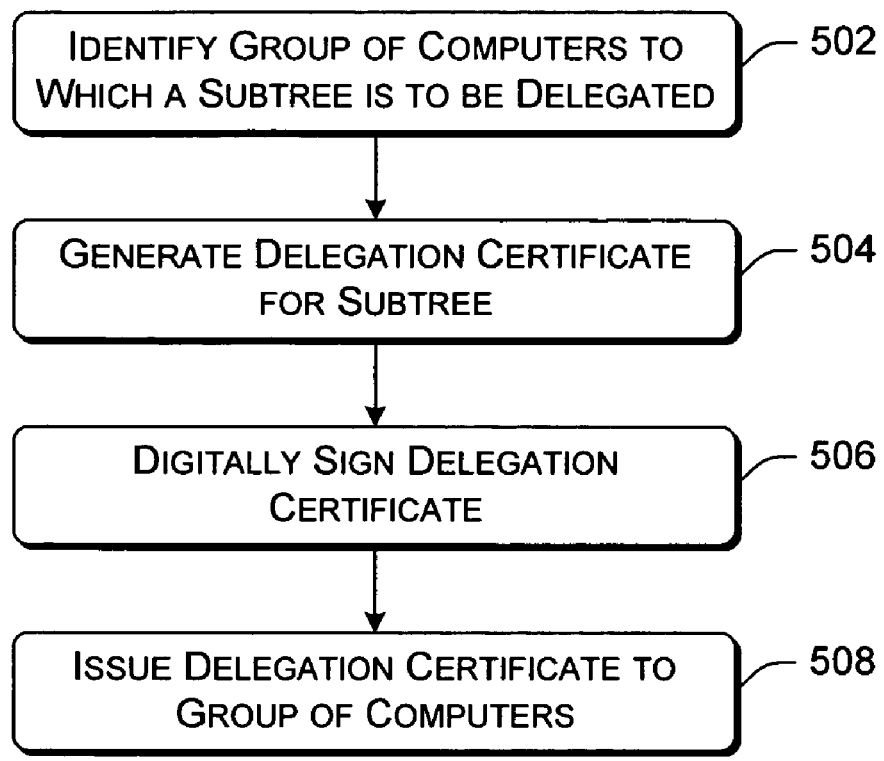
FIG. 5 is a flowchart illustrating an exemplary process for delegating management responsibility for a subtree to another directory group.

FIG. 5 is a flowchart illustrating an exemplary process 500 for delegating management responsibility for a subtree to another directory group. Process 500 is performed by the subtree delegation modules 254 of the computers in the directory group that are delegating management responsibility for the subtree. Initially, a group of computers to which the subtree is to be delegated is identified (act 502). A delegation certificate for the subtree is generated (act 504) and is digitally signed by one or more members of the delegating group (act 506). The digitally signed delegation certificate is then issued to the group of computers being delegated the management responsibility for the subtree (act 508).

Returning to FIG. 4, each computer in distributed file system 150 maintains a local cache (e.g., cache 260 of FIG. 2) mapping some subset of the pathnames in the name space to the directory group that manages that pathname. For example, a particular computer's cache may include a mapping of each of pathnames /A, /A/B, /A/B/C, /A/F, and /A/F/G to directory group 404. Different computers can have different mappings in their caches, but each typically includes at least a mapping of the namespace root to its managing directory group (directory group 402).

Maintaining a pathname to managing directory group mapping allows a computer to perform at least some of the directory group lookup process itself locally rather than always requiring accessing the directory group managing the namespace root (and perhaps other directory groups). For example, assume that a computer desires to access a file called "foo.txt" with the pathname /A/B/foo.txt, and that the computer has in its local cache the mapping of the pathnames for directory group 404. In this example, the computer can readily identify from its own local cache the members of directory group 404 that manage the files in directory B, and thus the file foo.txt. Thus, the determination of which computers to access to determine the location of the file "foo.txt" (that is, which computers manage the directory entries for pathname /A/B) is made by the computer based on the information in its cache, without having to access either directory group 402 or 404 to make the determination.

If a computer does not have enough information in its local cache to map the entire pathname to a directory group, the computer finds the mapping for the longest prefix in the pathname that exists in its cache. The computer then accesses the directory group that manages the last directory in that longest prefix to determine the directory groups managing as much of the rest of the pathname and their delegation certificates as possible. This process of accessing directory groups and obtaining delegation certificates continues until the proper mapping is found.

For example, assume that a computer desires to access a file called "foo2.txt" with the pathname /A/B/C/D/foo2.txt, and that the computer has in its local cache the mapping of the pathnames for directory group 404 but not for directory group 406. The computer looks at the pathname and finds the mapping for the longest prefix in its cache that is in the pathname (/A/B/C) and accesses the directory group responsible for managing that directory, which is directory group 404. The computer queries a member of directory group 404 for the delegation certificate(s) for the relevant subtrees for pathname /A/B/C/D/foo2.txt, which is the delegation certificate for directory group 406. The member of directory group 404 returns this delegation certificate to the querying computer, which in turn can verify the delegation certificate (e.g., based on the public key(s) of the signing computer(s)). The received delegation certificate identifies the directory group that is responsible for managing the directory /D, so the computer knows to access that directory group in order to determine where to locate the file "foo2.txt". Thus, although the determination of which computers to access to determine the location of the file "foo2.txt" involved accessing a member of directory group 404, no access to a member of directory group 402 was required to make the determination.

Figure 6:
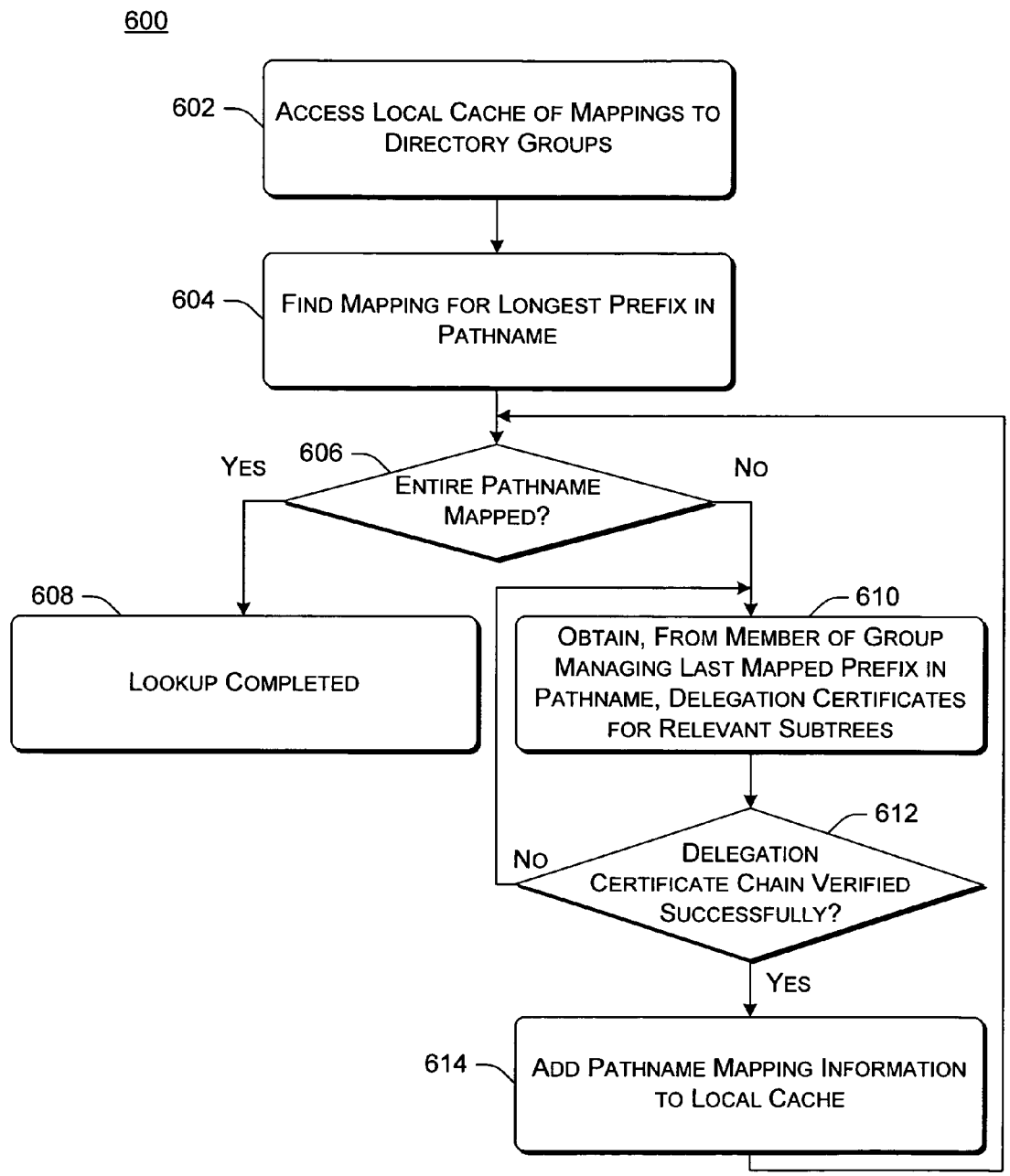
FIG. 6 is a flowchart illustrating an exemplary process for looking up the directory group responsible for managing a particular pathname.

FIG. 6 is a flowchart illustrating an exemplary process 600 for looking up the directory group responsible for managing a particular pathname. Process 600 is performed by directory group lookup module 222 of FIG. 2 of the computer desiring to access the pathname being looked up. Initially, a local cache of mappings to directory groups is accessed (act 602) and the mapping for the longest prefix in the pathname found in the cache (act 604). Processing then proceeds based on whether the entire pathname is mapped (act 606). If the entire pathname is mapped, then the directory group lookup process is completed (act 608). However, if the entire pathname is not mapped, then a delegation certificate(s) for the relevant subtree(s) is obtained from a member of the group managing the last mapped prefix in the pathname (act 610). The received delegation certificate(s) is then verified (act 612). If the delegation certificate does not verify correctly or cannot be obtained, then the process returns to act 610 and selects a different member of the group to query. As long as there is at least one correctly functioning member of the group managing the last mapped prefix online, the process will eventually succeed. If there is no correctly functioning member of the group managing the last mapped prefix online, then the process looks for a shorter prefix that is still valid, or alternatively may return to the name space root. Once the delegation certificate chain is verified, the pathname mapping information from the certificate is added to the local cache (act 614). The process then returns to act 606, with the longest prefix now being the previously longest prefix with the new relevant subtree information concatenated thereto (for example, if the pathname is /A/B/C/D/E/F, the previous longest prefix was /A/B, and the new relevant subtree was /C/D, then the new longest prefix would be /A/B/C/D). Acts 606, 610, 612, and 614 are then repeated until the entire path name is mapped. By separating the management of different directories onto different directory groups, the management responsibility is spread out over multiple different computers. This reduces the management burden on particular computers, especially those computers in the directory groups at and closest to the namespace root. For example, a particular pathname need not be parsed beginning with the root node, but rather can be picked up partway through the pathname via the local cache.

Directory and File Replication and Storage

Distributed file system 150 of FIG. 1 manages the storage of directory entries and the files corresponding to those entries differently. A file being stored in system 150 is replicated and saved to multiple different computers in system 150. Additionally, a directory entry is generated for the file and is also saved to multiple different computers in system 150 that are part of a Byzantine-fault-tolerate group. The directory entry is saved to more computers than the file is saved to, as discussed in additional detail below.

The different treatment for storage of files and directory entries described herein can be used in conjunction with the hierarchical storage structure discussed above. However, the different treatment for storage of files and directory entries described herein can also be used in systems that do not employ a hierarchical storage structure.

A Byzantine-fault-tolerant group is a group of computers that can be used to store information and/or perform other actions even though a certain number of those computers are faulty (compromised or otherwise unavailable). A computer can be compromised in a variety of different manners, such as a malicious user operating the computer, a malicious program running on the computer, etc. Any type of behavior can be observed from a compromised computer, such as refusing to respond to requests, intentionally responding to requests with incorrect or garbage information, etc. The Byzantine-fault-tolerant group is able to accurately store information and/or perform other actions despite the presence of such compromised computers. Byzantine groups are well-known to those skilled in the art, and thus will not be discussed further except as they pertain to the present invention.

It is known to those skilled in the art that for certain types of computations in order to be able to operate correctly despite a number of failed computers $f$ (a failed computer may be compromised or otherwise unavailable, such as powered down), the Byzantine-fault-tolerant group should include at least $3f+1$ computers. In distributed file system 150, the directory entries are stored on the $3f+1$ computers of a Byzantine-fault-tolerant group, while the file itself is stored on $f+1$ computers (which may be one or more of the same computers on which the directory entry is stored).

Figure 7:
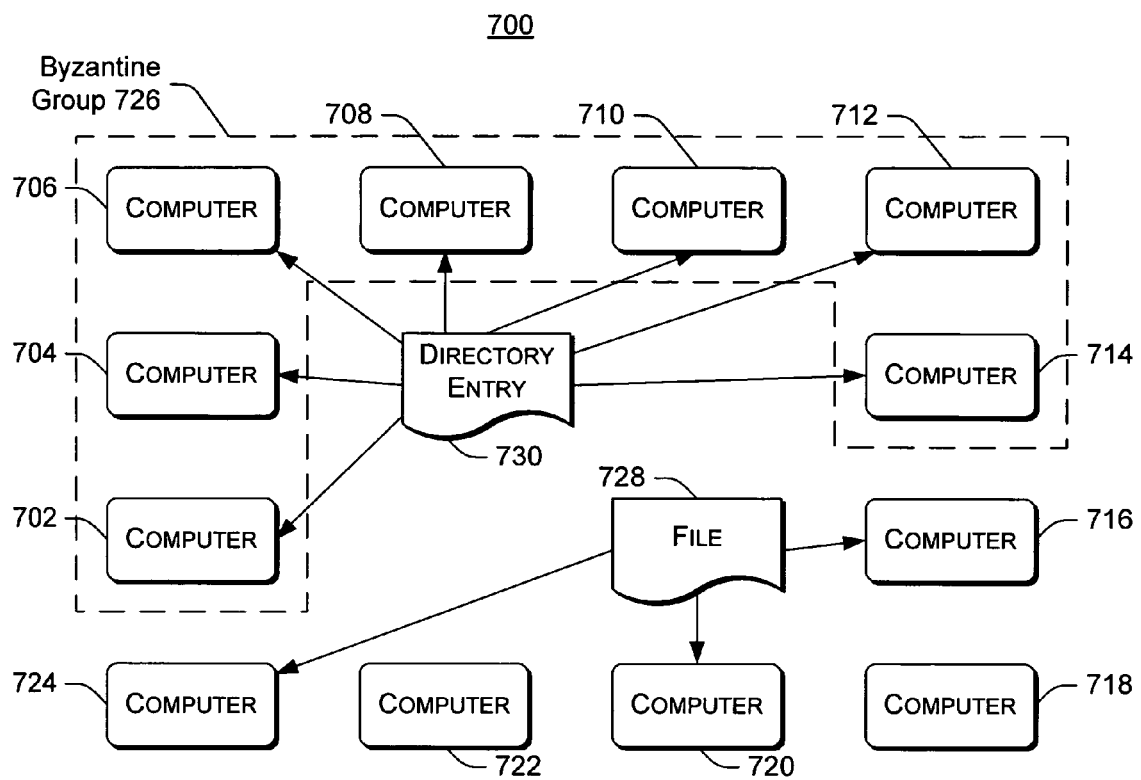
FIG. 7 illustrates the exemplary storage of a file and corresponding directory entry in a serverless distributed file system.

FIG. 7 illustrates the exemplary storage of a file and corresponding directory entry in a serverless distributed file system. File system 700 (e.g., a serverless distributed file system 150 of FIG. 1) includes twelve computers 702, 704, 706, 708, 710, 712, 714, 716, 718, 720, 722, and 724. Assuming that the designer of system 700 desires to be able to tolerate two computer failures, the Byzantine-fault-tolerate group should include at least seven ((3·2)+1) computers. Byzantine group 726 is illustrated including computers 702-714.

When a file 728 is to be stored in file system 700, a corresponding directory entry 730 is stored by the computers in the appropriate directory group (the directory group responsible for managing the directory the file is stored in, based on the pathname of file 728). The directory group in FIG. 7 for directory entry 730 is Byzantine group 726, so the directory entry 730 is stored on each correctly functioning computer 702-714 in Byzantine group 726. Thus, directory entry 730 is stored on up to seven different computers. File 728, on the other hand, is replicated and stored on each of three computers (computers 716, 720, and 724). As illustrated, the computers on which file 728 are stored need not be, and typically are not, in Byzantine group 726 (although optionally one or more of the computers on which file 728 are stored could be in Byzantine group 726).

Each directory entry includes the name of the corresponding file, an identification of the computers that the file is stored at, and file verification data that allows the contents of the file to be verified as corresponding to the directory entry. The file verification data can take a variety of different forms, and in one implementation is a hash value generated by applying a cryptographically secure hash function to the file, such as MD5 (Message Digest 5), SHA-1 (Secure Hash Algorithm-1), etc. When a file is retrieved from storage, the retrieving computer can re-generate the hash value and compare it to the hash value in the directory entry to verify that the computer received the correct file. In another implementation, the file verification data is a combination of: a file identification number (e.g., a unique identifier of the file), a file version number, and the name of the user whose signature is on the file.

Figure 8:
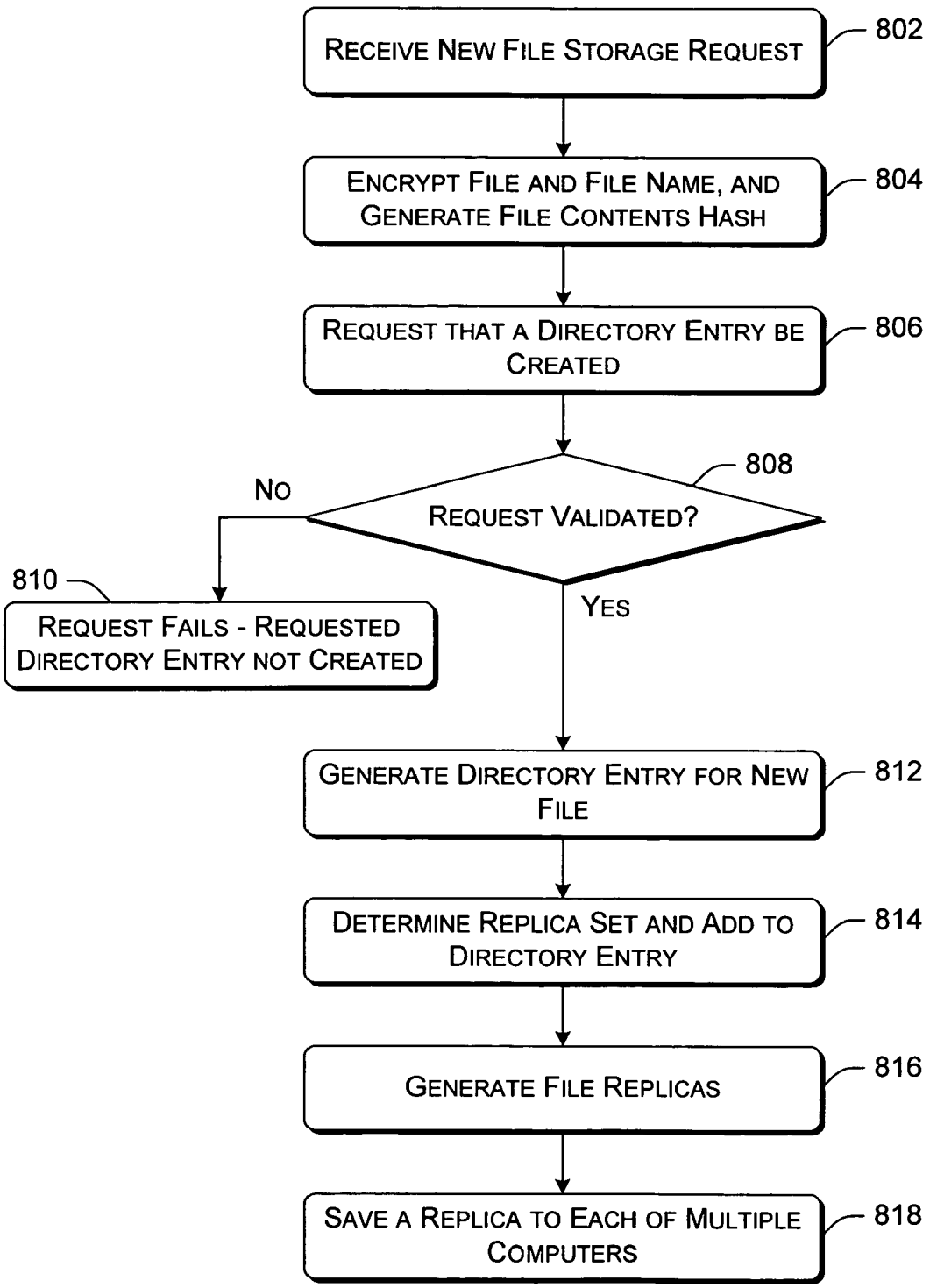
FIG. 8 is a flowchart illustrating an exemplary process for storing a file in a serverless distributed file system.

FIG. 8 is a flowchart illustrating an exemplary process for storing a file in a serverless distributed file system. Initially, a new file storage request is received at a client computing device (act 802). The client encrypts the file and the file name and generates the file contents hash (act 804). The client sends the encrypted file name and file contents hash to the appropriate Byzantine-fault-tolerant directory group along with a request to create a directory entry (act 806). The directory group validates the request (act 808), such as by verifying that the file name does not conflict with an existing name and that the client has permission to do what it is requesting to do. If the request is not validated then the request fails (act 810). However, if the request is validated, then the directory group generates a directory entry for the new file (act 812). The directory group also determines the replica set for the new file and adds the replica set to the newly generated directory entry (act 814). Replicas of the file are also generated (act 816), and saved to multiple computers in the file system (act 818).

By storing the directory entries in a Byzantine group, and including file verification data in the entries, fault tolerance is maintained (up to $f$ failures). However, storage space requirements and Byzantine operations are reduced by storing files separately from directories and not using Byzantine operations to access them. For example, directory entries may be on the order of one hundred bytes, whereas the file itself may be on the order of thousands or even billions of bytes.

Directory and File Lock Mechanism

Each object (e.g., directory and file) in distributed file system 150 of FIG. 1 has associated with it a set of leased locks. These locks are used to determine, based on the type of operation an application desires to perform, whether the application can open a directory or file to perform that operation. A lock can be viewed as a lease with a particular time span that depends on the type of lock and the level of contention. For example, the time span on a write lock may be a few minutes, while the time span on a read lock may be as long as a few days. When an application desires to perform an operation(s) on an object, the client computer on which the application is executing looks to see if it already has the necessary locks to perform the operation(s). If not, it requests the appropriate lock(s) from the directory group responsible for managing that object. Once the application has finished performing the desired operation, it can optionally release the lock(s) it acquired or keep it until it automatically expires or is recalled by the managing directory group.

For a particular directory, the Byzantine-fault-tolerant group that implements the directory controls the locks for: all files in the directory; the names of any subdirectories of the directory; and the right to delete the directory itself. The lock mechanism attempts to grant broad (coarse granularity) locks on appropriate files and directories to a requesting client computer so that the client computer can process many reads and/or updates with a single Byzantine lock acquisition rather than requiring multiple Byzantine messages for lock acquisitions.

In the illustrated example, the lock mechanism employs ten different locks: Read, Write, Open Read, Open Write, Open Delete, Not Shared Read, Not Shared Write, Not Shared Delete, Insert, and Exclusive. The Read and Write locks are used to control access to the data in the objects (e.g., the contents of a file). The Open Read, Open Write, Open Delete, Not Shared Read, Not Shared Write, and Not Shared Delete locks are used to control the opening of the objects. The Insert and Exclusive locks are special-use locks. These ten locks are discussed in more detail below. Depending on the operation an application desires to perform, the appropriate ones of these locks are requested by the application.

Read Lock. The Read lock is requested by an application so that the application can read the associated file. The Read lock, in conjunction with the Write lock, allows the directory group to keep data in the file consistent.

Write Lock. The Write lock is requested by an application so that the application can write to (also referred to as update) the associated file. The Write lock, in conjunction with the Read lock, allows the directory group to keep data in the file consistent.

When an application desires to open an object, the directory group performs two checks: (1) are the modes the application is asking for going to conflict with another application that has already opened the object; and (2) are the operations that the application is willing to share the object for going to conflict with what another application has already opened the object for and indicated it is willing to share the object for. Six of the ten locks are directed to supporting this checking: Open Read, Open Write, Open Delete, Open Not Shared Read, Open Not Shared Write, and Open Not Shared Delete. These locks are used to grant an application the ability to open an object, but do not necessarily guarantee that the data for the object can be obtained (the Read lock or Write lock (depending on the type of operation the application desires to perform) is obtained to access the data).

Open Read Lock. The Open Read lock is requested by an application to allow the application to open the associated object for reading.

Open Write Lock. The Open Write lock is requested by an application to allow the application to open the associated object for writing.

Open Delete Lock. The Open Delete lock is requested by an application to allow the application to open the associated object for deleting.

Open Not Shared Read Lock. The Open Not Shared Read lock is requested by an application when the application is not willing to share the ability to read the object with any other application.

Open Not Shared Write Lock. The Open Not Shared Write lock is requested by an application when the application is not willing to share the ability to write to the object with any other application.

Open Not Shared Delete Lock. The Open Not Shared Delete lock is requested by an application when the application is not willing to share the ability to delete the object with any other application.

The other two locks that are supported are the Insert Lock and the Exclusive Lock.

Insert Lock. The Insert lock is requested by an application to create a particular name for an object in a directory. Granting of the Insert lock gives the application permission to create the object with the particular name. The Insert lock conflicts with another Insert lock with the same object name, and with an Exclusive lock on the directory.

Exclusive Lock. The Exclusive lock is requested by an application to obtain all of the previously discussed nine locks, including an Insert lock on each possible name that could exist (but does not already exist) in the directory. An Exclusive lock on a directory does not imply Exclusive locks on the files or subdirectories in the directory, but rather only on the directory's namespace. The Exclusive lock conflicts with each of the previously discussed nine locks.

Various conflicts exist between the various different locks. Table I is a conflict matrix illustrating the conflicts between locks in one exemplary implementation. The following abbreviations are used in Table I: Ins (Insert), Excl (Exclusive), O-R (Open Read), O-W (Open Write), O-D (Open Delete), O-!R (Open Not Shared Read), O-!W (Open Not Shared Write), and O-!D (Open Not Shared Delete). An "X" in a cell of Table I indicates a conflict between the corresponding two locks—for example, Open Read conflicts with Open Not Shared Read but does not conflict with Open Not Shared Write.

However, if the check in act 904 identifies a conflict, then a request(s) is issued to the client(s) holding the conflicting locks to return them (act 910). A check is then made as to whether all of the requested locks were returned (act 912). If all of the requested locks were returned, then the requested locks are granted to allow the application to open the file with the selected locks (act 906), and the locks recorded (act 908). On the other hand, if all of the requested locks were not returned, then the open request is denied by the directory group (act 914).

In an attempt to improve performance when only one client computer accesses some region of the namespace, the file system 150 may issue a lock with broader scope than an application executing on the client requests, under the assumption that the application (or client) is likely to request additional related locks in the near future. For example, if an application opens file /A/B/C/foo.txt, the client requests a lock for this file. If the directory group grants the lock, it may upgrade the lock to a directory lock on /A/B/C (e.g., if, based on past performance, the directory group determines that conflicts on the directory are rare). If the application then

TABLE I

|      | Ins | Read | Write | Excl | O-R | O-W | O-D | O-!R | O-!W | O-!D |
|------|-----|------|-------|------|-----|-----|-----|------|------|------|
| Ins  | X   | X    | X     | X    |     |     |     |      |      |      |
| Read | X   |      | X     | X    |     |     |     |      |      |      |
| Write| X   | X    | X     | X    |     |     |     |      |      |      |
| Excl | X   | X    | X     | X    | X   | X   | X   | X    | X    | X    |
| O-R  |     |      |       | X    |     |     |     | X    |      |      |
| O-W  |     |      |       | X    |     |     |     |      | X    |      |
| O-D  |     |      |       | X    |     |     |     |      |      | X    |
| O-!R |     |      |       | X    | X   |     |     |      |      |      |
| O-!W |     |      |       | X    |     | X   |     |      |      |      |
| O-!D |     |      |       | X    |     |     | X   |      |      |      |

Figure 9:
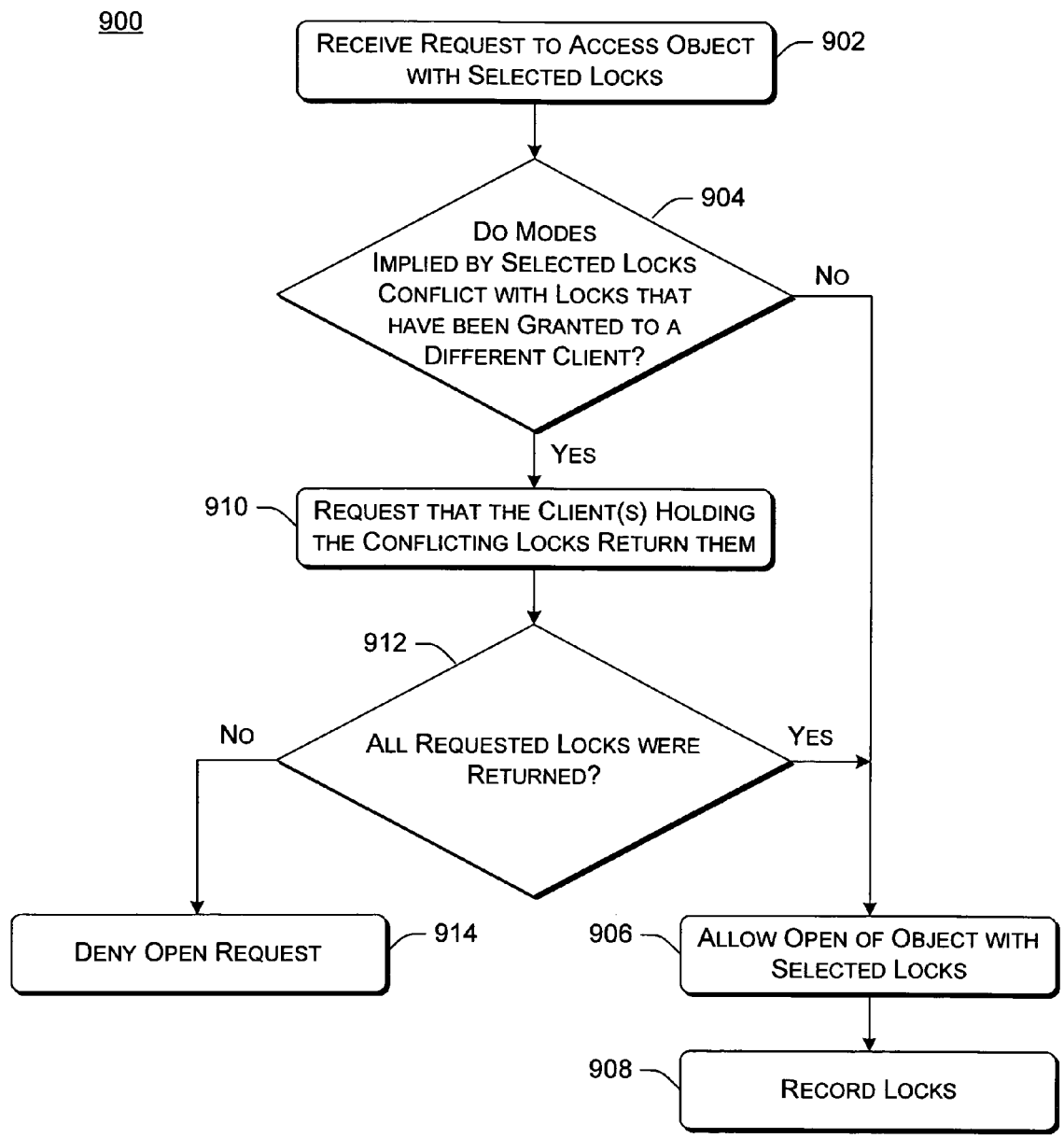
FIG. 9 is a flowchart illustrating an exemplary process for determining whether to allow a particular object to be opened.

FIG. 9 is a flowchart illustrating an exemplary process for determining whether to allow a particular object to be opened. The process of FIG. 9 is implemented by the directory group responsible for managing the particular object. In the process of FIG. 9, it is assumed that the client requesting to open the particular object does not already have the necessary lock(s) to open the object as desired. Initially, a request to access an object with particular locks identified is received (act 902). A check is made by the directory group as to whether the modes implied by the selected locks conflict with locks that have been granted to a different client (act 904). For example, if the request is a request to open an object for reading, but another application has already opened the object with the Not Shared Read lock, then the mode (open read) implied by the selected lock conflicts with another application that has already opened the object. Because the directory group knows only if it has issued a conflicting lock to a client, but not whether the client is currently using the lock to allow an application access to an object, in some cases making the check in act 904 requires asking a client that currently holds a lock is willing to give it up.

If the check in act 904 identifies no conflict, then the requested locks are granted to allow the application to open the file with the selected locks (act 906), so the request in act 902 is granted. The fact that these locks have been granted, and the clients to which they have been granted are then saved by the directory group (act 908) so that they can be used to determine conflicts for subsequent requests, and can be used to attempt recalls of locks when necessary.

opens another file in the same directory, the client can open the file without needing to request another lock from the directory group.

If a client's lock request conflicts with an existing lock granted to another client, the directory group may attempt to downgrade the earlier-issued lock to one that will not conflict with the new request at act 910 (e.g., rather than denying the request in act 914). Since lock upgrades result in clients holding locks that they did not request, lock downgrades typically have a non-trivial likelihood of success. If the lock recall fails, then the request is denied.

Various operations can be performed on objects in a file system. Table II below describes several of the more common operations and what locks are requested by an application in order to perform the operations.

TABLE II

| Operation | Description |
|-----------|-------------|
| Read Object | A request to read a directory or file. Requires an Open Read lock for the object followed by a Read lock. Optionally, if desired, the application may request any of the Open Not Shared locks. |
| Write/Update Object | A request to write to a file. Requires an Open Write lock for the object followed by a Write lock. Optionally, if desired, the application may request any of the Open Not Shared locks. |
| Delete File | A request to delete a file in a directory. Requires the Open Delete and Write locks. Usually the application will also request all of the Open Not Shared locks. |
| Delete Directory | A request to delete a directory. Requires an Exclusive lock for the directory. Directories may only be deleted |

TABLE II-continued

| Operation | Description |
|---|---|
| | when they are empty. |
| Rename Directory | A request to rename a directory. Requires an Exclusive lock on the parent directory (the directory for which the directory being renamed is a subdirectory), and an Insert lock for the new directory name in the destination directory. If the rename is across directories then the insert lock will be required for the new parent directory. |
| Rename File | A request to rename a file in a directory. Requires a Write lock on the file, and an Insert lock for the new name in the directory (which may be a different directory, if the rename is across directories). |
| Create Object | A request to create a new file or directory. Requires an Insert lock for the new name. |

Any changes made to a file are made locally by the computer and then the file (after being encrypted) is pushed back to the directory group responsible for managing the file. This information is stored to the various computers in the directory group, and the updated file is stored to the appropriate computers.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method implemented in a serverless distributed file system, the method comprising:
   receiving a request to open an object with one or more selected locks;
   checking whether the one or more selected locks conflict with a lock already granted to another application,
   denying the request to open the object if the one or more selected locks conflict with a lock already granted to another application; and
   granting the request to open the object only if the one or more selected locks do not conflict with a lock already granted to another application, wherein the granting comprises:
      attempting to upgrade a particular selected lock of the one or more selected locks to a broader scope than the one or more selected locks indicated in the request such that upgrading the particular selected lock to the broader scope comprises upgrading the particular selected lock to a directory lock; and
      activating a lease on the one or more selected locks.

2. A method as recited in claim 1, further comprising:
   when it is determined that the one or more selected locks conflict with a lock already granted to another application, requesting that the application that holds the lock that conflicts with the one or more selected locks return the conflicting lock; and
   granting the request to open the object if the conflicting lock is returned, otherwise denying the request to open the object.

3. A method as recited in claim 1, further comprising:
   upgrading the particular selected lock to a broader scope than indicated in the request;
   checking whether the particular selected lock, after being upgraded to the broader scope, conflicts with a lock already granted to another application; and
   granting the request to open the object with the particular selected lock upgraded to the broader scope only if the checking of the particular selected lock of the upgraded broader scope indicates that no conflict exists.

4. A method as recited in claim 1, further comprising:
   denying the request to open the object if checking whether the one or more selected locks indicates a desire to share the object for one or more operations that conflict with sharing indicated by another application that has previously been granted a lock.

5. A method as recited in claim 1, further comprising:
   attempting to downgrade a lock previously granted to another application to not conflict with the one or more selected locks prior to denying the request to open the object with the one or more selected locks if the one or more selected locks conflict with a lock already granted to another application.

6. A method as recited in claim 1, wherein the object comprises a file.

7. A method as recited in claim 1, wherein the object comprises a directory.

8. A method as recited in claim 1, wherein the one or more selected locks comprise an Open Read lock.

9. A method as recited in claim 1, wherein the one or more selected locks comprise an Open Write lock.

10. A method as recited in claim 1, wherein the one or more selected locks comprise an Open Delete lock.

11. A method as recited in claim 1, wherein the at least one selected lock comprises a Not Shared Read lock.

12. A method as recited in claim 1, wherein the at least one selected lock comprises a Not Shared Write lock.

13. A method as recited in claim 1, wherein the at least one selected lock comprises a Not Shared Delete lock.

14. A method as recited in claim 1, wherein the one or more selected locks comprise at least one of:
   an Open Read lock to control opening of the objects for reading;
   an Open Write lock to control opening of the objects for writing; or
   an Open Delete lock to control opening of the objects for deleting.

15. One or more computer storage media having stored thereon a plurality of instructions to implement a serverless distributed file system, wherein the plurality of instructions, when executed, direct a computing system to perform a method comprising:
   assigning responsibility for managing one or more directories to a directory group, wherein each member of the directory group is a computer participating in the serverless distributed file system; and
   employing a plurality of locks to control access to objects in each directory, wherein the plurality of locks comprise:
      a first set of locks to control opening of the objects, wherein the first set of locks comprises more than one lock; and
      a second set of locks, separate from the first set of locks, to control access to data in the objects, wherein the second set of locks comprises more than one lock.

16. One or more computer storage media as recited in claim 15, wherein the second set of locks comprises at least one of:
   a Read lock to control read access to the data in the objects; or a Write lock to control write access to the data in the objects.

17. One or more computer storage media as recited in claim 15, wherein the first set of locks comprises at least one of:
- an Open Read lock to control opening of the objects for reading;
- an Open Write lock to control opening of the objects for writing; or
- an Open Delete lock to control opening of the objects for deleting.

18. One or more computer storage media as recited in claim 15, wherein the first set of locks comprises:
- a Not Shared Read Lock to indicate an unwillingness to share the ability to read the objects.

19. One or more computer storage media as recited in claim 15, wherein the first set of locks comprises:
- a Not Shared Write Lock to indicate an unwillingness to share the ability to write to objects.

20. One or more computer storage media as recited in claim 15, wherein the first set of locks comprises:
- a Not Shared Delete Lock to indicate an unwillingness to share the ability to delete the objects.

21. One or more computer storage media as recited in claim 15, wherein the plurality of locks further comprises an Insert lock to control creation of a new object with a particular name.

22. One or more computer storage media as recited in claim 15, wherein the plurality of locks further comprises an Exclusive lock to obtain all of the other ones of the plurality of locks for an object.

23. One or more computer storage media as recited in claim 15, wherein the objects comprise one or more files and one or more directories.

* * * * *